Inventors.
ALAN POLLARD
ALFRED GEORGE WRIGHT
By Kurt Kelman
AGENT

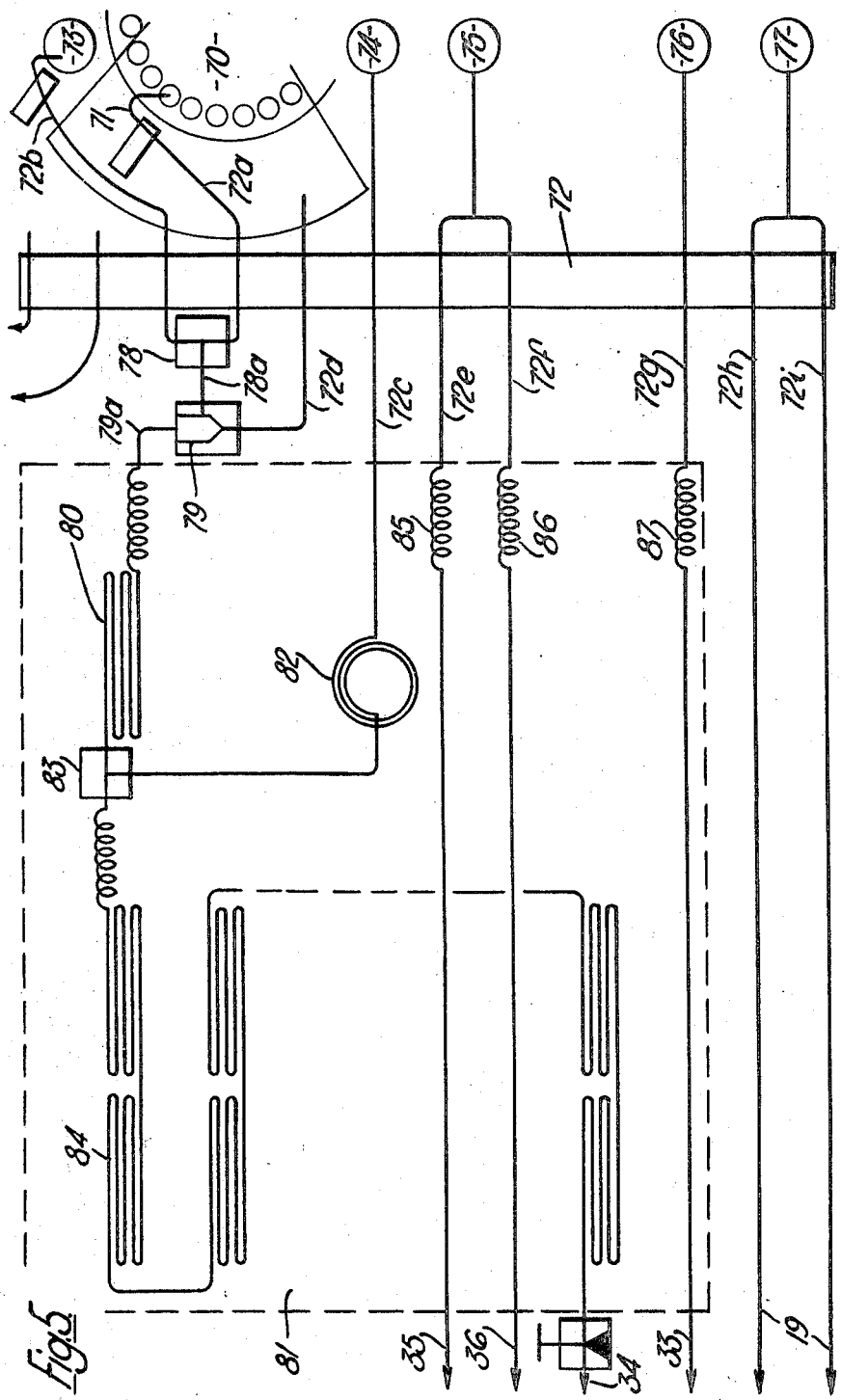

United States Patent Office 3,575,691
Patented Apr. 20, 1971

3,575,691
APPARATUS FOR CONTINUOUSLY PREPARING AND MOUNTING WET FILTRATION SPECIMENS
Alan Pollard, St. Thomas's Hospital Medical School, Lambeth Palace Road, London, SE.1, England, and Alfred G. Wright, 7 Cardigan Road, London, NW.6, England
Filed Mar. 14, 1967, Ser. No. 622,946
Claims priority, application Great Britain, Mar. 14, 1966, 11,082/66
Int. Cl. G01n 1/00
U.S. Cl. 23—253                                      3 Claims

ABSTRACT OF THE DISCLOSURE

The invention consists in an apparatus for automatically filtering a succession of liquid/solid mixtures so as to deposit the solid component of each mixture on an individual discrete portion of the length of a continuous strip of filter medium and thereafter retaining the solids on the strip by adhesively securing a protective film to at least one face of the strip. The protected strip with the solids retained in the order of their deposition may thereafter be examined and/or stored (e.g. in reeled form) without risk of disturbing the solids.

This invention concerns sequential sample analysis and is primarily applicable to the sequential analysis of samples in the form of precipitates or suspended solids that are analysed by separation from a liquid/solid system and are then subjected to measurement of a physical property, such as radioactivity, X-ray fluorescence, optical transmittance or reflectivity, dielectric constant or magnetism. The invention has for instance particular applicability to the quantitative determination of substances such as proteins and similar complex constituents of body fluids by techniques such as radioimmunoassay (see "The Hormones," vol. IV, pages 557 et seq., Academic Press, London, 1964), "Substoichiometric Analysis" (as described in "Talanta" 1965, 12, 967–70) and radioactive labelling of the substance, in each of which a reaction is followed by determination of the radioactivity of a mass filtered from the reaction system. The invention will be described in relation to its application to such analytical techniques but it will be understood that the invention is also applicable with or without modificaton to the performance of other broadly similar analytical techniques.

In radioimmunoassay, to which the invention is particularly applicable, a specimen of the substance, e.g. a protein or like antigen, to be determined, competes in reaction with a similar but radioactively labelled substance for a binding agent (antibody) that renders a proportion of the substance insoluble. Separation of the liquid and solid components of the system and measurement of the radioactivity of the separated solid components leads to the determination of a radioactivity level that is related to the amount of the substance of interest in the original specimen. Quantitative determination of the substance of interest in the specimen is thus possible by comparison of the measured radioactivity level with the radioactivity levels determined by identical experiments performed upon specimens containing known and standardised amounts of the substance of interest.

There are numerous difficulties in the way of obtaining reliable determinations by this technique; the dispersion of the results obtained by successive determinations carried out on one particular specimen makes it necessary to carry out a number of separate determinations for any one specimen in order to derive a statistically significant result, and the reaction needs to be carried out under closely controlled conditions which must be maintained for an extended period, often several hours, if equilibrium conditions are to be obtained in the reaction system to minimise variations of results due to variation in conditions during a series of such determinations.

The technique is therefore exceptionally tedious and time-consuming to perform by "manual" methods and considerable effort has been expended in developing equipment capable of automatically performing, successively upon each of a sequence of samples, the required reactions under standardised and closely controlled conditions, in order to avoid waste of human effort and risk of errors by the operator and also to make practicable the use of shortened reaction times with determinations based upon non-equilibrium reaction systems, thereby to increase the number of determinations that may be reliably performed in a given period.

Thus, there has been developed a continuous flow reactor apparatus comprising a sampler and a proportioning pump, e.g. a peristaltic proportioning pump, that feeds appropriate individual quantities of various reactants with each of a series of standard samples of a fluid containing the substance of interest to a reactor in the form of an extended conduit in which each individual sample is mixed with the reactants to form a reaction mixture, the mixtures corresponding to the samples passing in continuous sequence, but preferably separated from one another by a gas (e.g. air) bubble, through the reactor at a rate such that each sample is retained in the reactor for the appropriate time.

With such apparatus there is discharged from the reactor a continuous sequence of liquid/solid reaction systems corresponding in order with the performance of the desired reaction with successive samples containing a substance of interest. The remainder of the determination technique comprises filtration of each emerging reaction system and the determination of the radioactivity level of the solid constituent derived from each such reaction system.

The primary object of the present invention is to provide apparatus for accomplishing the required filtration of the successive reaction systems, such as discharged by apparatus of the aforementioned character, in a mechanised manner and suited to the subsequent automatic accomplishment of the examination of the solids filtered from such samples, whereby the entire procedure for performing the reaction and examining the solid constituents of such reaction may be performed entirely automatically for a continuous sequence of samples containing a substance of interest.

In its broadest aspect, the invention provides apparatus comprising a filtration unit including a permeable filter support, means for discharging material for filtration on to an extended strip of filter medium (e.g. glass fibre) traversing said filter support, a laminating unit including means for continuously securing a protective lamina over at least one surface of said strip subsequent to the latter traversing said filter support, and means for advancing such filter medium strip over said support and through said laminating unit.

The filtration unit may take a variety of forms. For instance, the filter support may be constituted by a perforated plate of for example, plastics material, or it may comprise a suitably mounted plate of porous material such as sintered glass or sintered PTFE. To assist rapid filtration, the side of the filter support that is remote from the strip of filter medium may bound a chamber from which the atmosphere may be exhausted.

The filter support is conveniently associated with a suitable guide for the filter medium strip. In typical embodiments of the invention, the filter support constitutes at least part of the web of a channel-like guide.

Preferably the filtration unit includes means for wetting the filter medium strip as it approaches the filter support so that the material to be filtered is discharged on to wet filter medium over said support for efficient filtration. Moreover, desirably the filtration unit includes means for directing a washing liquid on to the filter medium strip subsequent to the discharge of a sample of material to be filtered thereon so as to wash the filtered solids free from the liquid components of the material being filtered.

Moreover, and in accordance with a further feature of the invention, the apparatus may include means for applying reinforcement to the edges of the filter medium strip prior to the wetting thereof. Typically the apparatus includes means for applying a rubber solution to each edge of the filter medium strip as this approaches the filter support, the so-applied rubber solution drying to strengthen the edges of the strip to minimise the risk of its stretching or breaking under tension and also serving to provide impermeable edges to the strip to prevent or restrain liquids applied thereto from running off the edges of the strip during the filtration operation.

The means for advancing the strip of filter medium over said filter support may take a variety of forms and may consist of a suitable driven drum and roller system which in preferred embodiments of the invention constitutes part of the laminating unit.

The laminating unit conveniently comprises a system of rollers including a drum around which the filter medium strip is passed, and means for guiding a strip of adhesive protective film into contact with the filter medium strip so as to become adhered to a face of the latter as the filter medium strip passes around the drum. In preferred embodiments of the invention the laminating unit comprises a set of three parallel rollers mounted in a pivoted frame adjacent to a drum, the filter medium strip being led over two of said rollers and on to the drum in such manner that the filter medium strip reverses its direction in traversing said two rollers and is led on to the drum on the upper part thereof, the filter medium strip being nipped between the second of such two rollers and the drum with the adhesive film interposed between the latter and the filter medium strip and passing over the third roller in such manner that the adhesive film tension thereover determines the nip force. The said drum is conveniently driven to constitute, with said second roller, the means for advancing the filter medium strip.

The laminating unit may be arranged to secure a protective lamina over both faces of the said filter medium strip if it is necessary or desirable to protect both faces of the filter medium strip to ensure satisfactory retention on the strip of solids deposited theron by the filtration unit. In such a case the laminating unit could conveniently comprise a further roller cooperating with the said drum to guide an adhesive protective film into contact with the exposed face of the filter medium strip as this passes around the drum.

The adhesive protective film applied to one or both faces of the filter medium strip may conveniently be an adhesive plastics tape such as "Scotch tape," the laminating unit being adapted to support one or two reels of such tape.

The apparatus may incorporate means for drying the filter medium strip prior to application of a protective lamina to a face of the strip. Thus, typically, the laminating unit may include a blower with an electric heater so arranged as to direct a stream of heated air at the filter medium strip as it approaches and enters the laminating unit.

The apparatus may include means for reeling the protected filter medium strip for storage, before or after examination of solid material deposited on the filter medium strip and protected against disturbance by the overlying protective film. Conveniently a reeling unit may be arranged to draw the protected filter medium strip from the laminating unit and past a detector unit, for instance a scintillation or geiger counter for detecting the radioactivity level of the solid samples on the strip, and thereafter to reel the strip. Such reeling unit may conveniently comprise a reel driven through a slipping coupling so as to maintain an appropriate tension in the protected strip between the laminating unit and such reel for the speed of the strip to remain constant between the filtration unit and the detector unit.

In embodiments of the apparatus incorporating a detector unit such as a scintillation or geiger counter for determining radioactivity levels, such detector unit may be coupled to recording equipment for making a permanent record of the detected radioactivity levels. The recording equipment may comprise a chart recorder and/or a digital count totalizer with print-out device for producing a record of the radioactivity levels of successive samples of materials passing the detector unit. The recording equipment may be synchronised with the movement of the filter medium strip past the detector unit by means of a synchronising drive linkage between the recording equipment and the laminating unit or the reeling equipment. Especially in the case when the recording equipment includes a print-out device, this may be arranged to be tripped in synchronism with the taking of samples, of a specimen under examination, by the sampler that feeds such samples to the apparatus that performs the required reactions thereon.

A typical embodiment of apparatus in accordance with the invention is illustrated in the accompanying drawings in which:

FIG. 5 is a diagrammatic representation of a typical continuous flow reactor system that may be used in conjunction with the apparatus of the invention.

Figure 1:
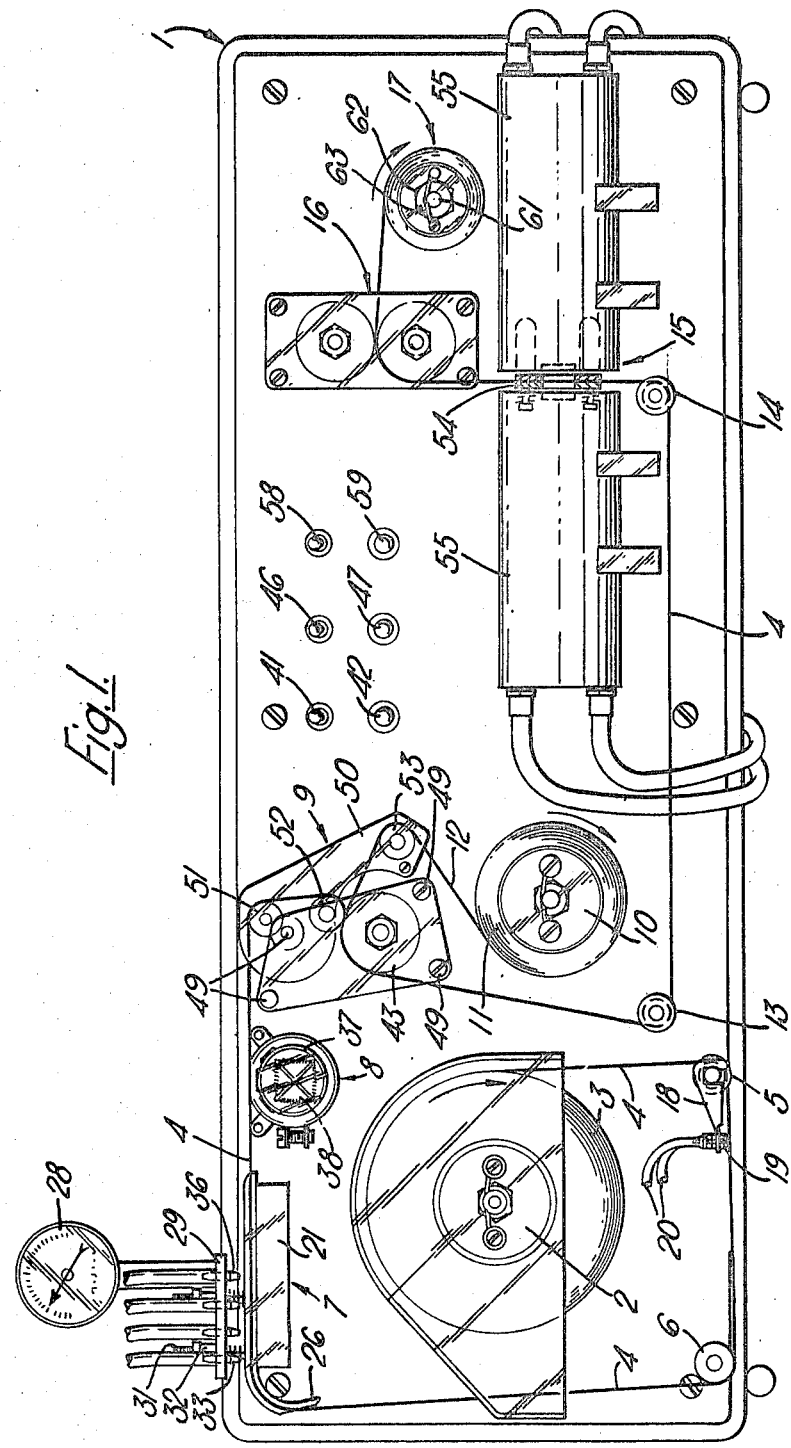
FIG. 1 is a front elevation of the apparatus.
Figure 2:
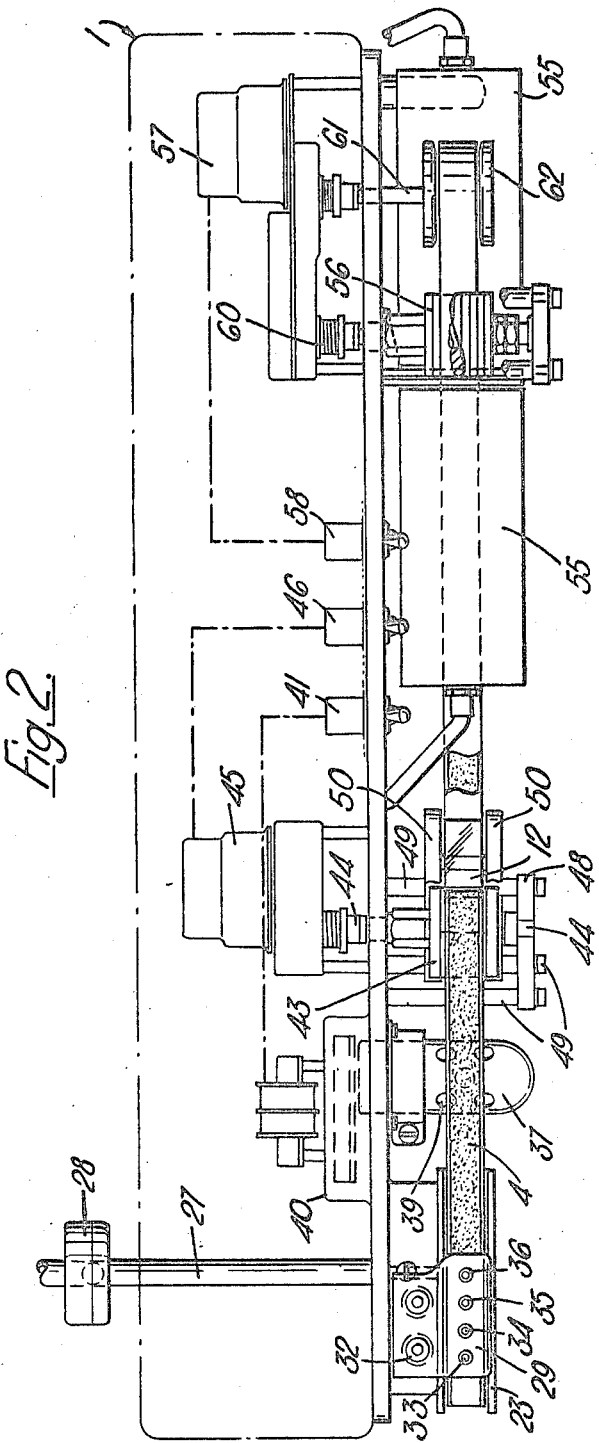
FIG. 2 is a plan view of the apparatus of FIG. 1.
Figure 3:
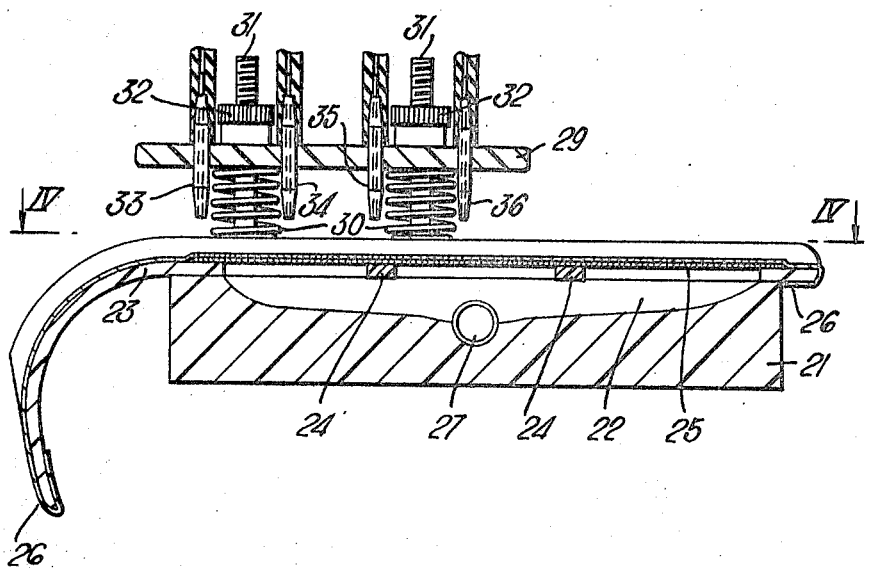
FIG. 3 is an enlarged vertical sectional view of the filtration unit of the apparatus.
Figure 4:
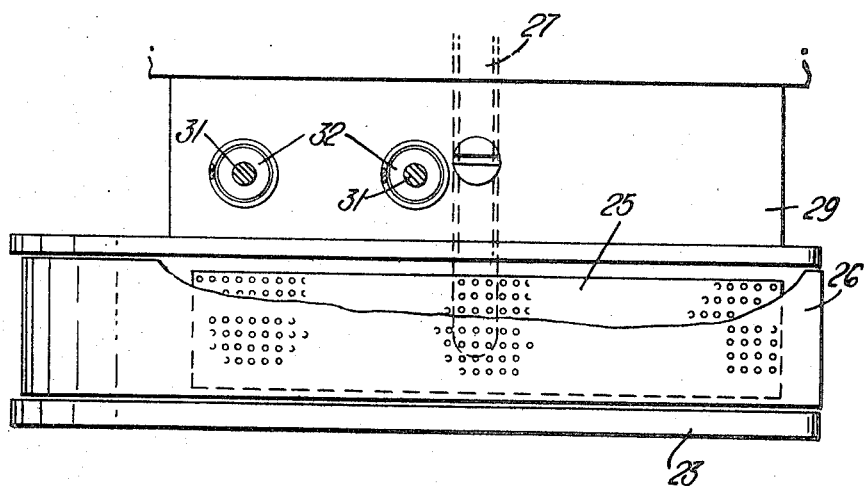
FIG. 4 is a section on the line IV—IV of FIG. 3.

The embodiment of the invention illustrated in FIGS. 1 to 4 of the accompanying drawings comprises a generally box-like housing 1 within which are housed various drive and control mechanisms described hereinafter and upon the front face of which are disposed a rotatable hub 2 for a reel 3 of filter medium strip 4; guide rollers 5 and 6 for leading the strip 4 from the reel 3 to a filtration unit 7; a strip dryer 8; a laminating unit 9; a rotatable hub 10 for a reel 11 of an adhesive protective film strip 12; guide rollers 13 and 14 for leading protected filter medium strip from the laminating unit 9 to an examination unit 15; a transport unit 16 and a reeling unit 17. The front face of the housing 1 also carries control switches and warning lights to which reference will be made hereinafter.

Typically the filter medium strip 4 used with such apparatus is of felted glass fibre which is somewhat fragile and easily ruptured under tension loads particularly when wet. Accordingly the apparatus further includes a bracket 18 clipped to the axle of the guide roller 5 and supporting a pair of nozzles 19 that are positioned to be traversed by the opposite edge regions of the strip 4 as this passes between the guide roller 5 and the guide roller 6. The nozzles 19 are connected to flexible tubes 20 by which a rubber solution is fed to the nozzles 19 so as to deposit on the edges of the strip 4 a rubber reinforcement that both strengthens the strip and also provides the latter with impermeable edges to prevent or restrain liquid supplied thereto from running off the edges of the strip during the filtration operation that is accomplished by the filtration unit 7.

The filtration unit 7 comprises in this embodiment of the invention a generally rectangular block 21 of plastics material for instance polymethylmethacrylate having a cavity 22 in its upper face overlaid by a channel 23 of similar material, the web of which channel is apertured leaving transverse bearers 24 for a perforated stainless steel plate 25. The channel 23 projects beyond the leading end of the block 21 and is curved downwardly to serve as a guide for the filter medium strip 4 approaching the filtration unit from the guide roller 6.

The plate 25 and the web of channel 23 are overlaid by a strip 26 of polytetrafluoromethylene to minimise friction between the filter medium strip 4 and the surface of the filtration unit engaging that strip, the strip 26 being perforated in register with perforations of the plate 25, so that a permeable filter support is constituted by these elements in the region over the cavity 22.

The cavity 22 communicates with a pipe 27 that extends through the housing 1 to a connection for a receiver and vacuum pump (not shown) the pipe 27 also communicating with a vacuum gauge 28 at the rear of the housing 1.

The filtration unit 7 further comprises a nozzle support plate 29 mounted on compression springs 30 surrounding pillars 31 extending upwardly from the block 21 and through holes in the support plate 29. The pillars 31 are screwthreaded at their upper ends to receive thumb nuts 32 by means of which the height of the support plate 29 above the channel 23 may be adjusted.

The support plate 29 has four nozzles 33, 34, 35 and 36 arranged along the centreline of the channel 23 over the leading end portion of the block 21, these nozzles being connected by flexible tubing to means (not shown) for feeding fluids on to the filter medium strip 4 as this passes through the filtration unit.

It should be understood that the support plate 29 may mount fewer or more nozzles than the four illustrated depending upon the particular use to which the apparatus is to be put. Typically the fluid supplies for the four nozzles shown would be so organised that nozzle 33 receives a pre-wetting liquid for wetting the filter medium strip 4 as this approaches the permeable filter support, that is the region of the channel 23 above the cavity 22 while the nozzle 34 receives the material to be filtered (e.g. the reaction mixture obtained in the technique of radioimmunoassay), and the nozzles 35 and 36 both receive washing liquid for washing filtered solids left on the filter medium strip 4.

The strip dryer 8, as shown in the drawings, is disposed below the path taken by the filter medium strip 4 between the filtration unit 7 and the laminating unit 9. The dryer 8 comprises a glass bulb 37 housing a resistance element 38 and having apertures 39 in its upper aspect, a blower 40 disposed within the housing 1 and controlled by a switch 41 with associated warning light 42 being arranged to cause a flow of air over the element 38 and out of the bulb 37 through the apertures 39 so as to impinge upon the underside of the filter medium strip 4 as this passes over the dryer, thereby to dry the strip by forced evaporation of liquid absorbed thereby.

The laminating unit 9 comprises a resiliently tyred drum 43 mounted on a shaft 44 that extends through the front wall of the housing 1 and is coupled to a drive unit 45 comprising an electric motor and a reduction gear box controlled by a switch 46 with associated warning light 47.

A steady plate 48 supports a forward extension of the shaft 44 and is itself mounted on pillars 49 on the front face of the housing 1.

The laminating unit further comprises a pair of parallel support plates 50 pivotally supported on one of the pillars 49 and carrying three rollers 51, 52 and 53. The filter medium strip 4 passes in turn over the rollers 51 and 52 on to the drum 43, reversing its direction so that the surface thereof which was uppermost in traversing the filtration unit 7 becomes lowermost at the point of engagement with the drum 43. It will be observed that tension in the strip 4 produces a small resultant rocking moment acting on the pivotally mounted plates 50 in such direction as to urge the roller 52 towards the drum 43 with a force that is proportional to the tension in the strip 4. Thus the strip 4 is firmly gripped between the drum 43 and the roller 52 to an extent sufficient to advance the strip 4 without slippage.

The roller 53 serves to guide the adhesive protective film strip 12 from its reel 11 on to the drum 43 so as to approach the latter tangentially at the nip between drum 43 and the roller 52. It will be observed that tension in the strip 12 produces a rocking moment on the plates 50 to urge the roller 52 firmly against the drum 43. The arrangement is such therefore that as drum 43 rotates the filter medium strip 4 and the adhesive protective film strip 12 are both drawn together at the nip between drum 43 and roller 52 so as to adhesively secure the strip 12 to that face of the filter medium strip 4 upon which filtered solids are deposited in the operation of the filtration unit.

The guide rollers 13 and 14 serve to lead the laminated strip comprising the filter medium strip 4 and the adhesive protective film strip 12 adhesively secured thereto from the laminating unit 9 to the examination unit 15. In this embodiment of the invention, intended for use in performing radioimmunoassay, the examination unit comprises a gate 54 that consists of a pair of parallel plates having registering rectangular apertures and between which the laminated strip passes. On opposite sides of the gate 54 there are disposed a pair of detectors 55, e.g. scintillation or geiger counter tubes, that serve to detect radiation from each side of that portion of the laminated strip instantaneously within the gate 54. The detectors 55 are connected to suitable recording equipment (not shown) that integrates the outputs of the detectors 55 and produces a suitable record of the detected radioactivity levels. Depending upon requirements the recording equipment may include a chart recorder and/or a digital count totalizer with printout device.

The transport unit 16 is disposed above the gate 54 and comprises a pair of resiliently-tyred rollers 56 driven by an electric motor 57 (controlled by a switch 58 with associated warning light 59) through a slipping clutch mechanism 60 so that constant tension is maintained in the laminated strip in its passage from the laminating unit 9 through the gate 54 to the transport unit 16. The motor 57 also drives the reeling unit 17 that comprises a shaft 61 adapted to support a reel 62 that is frictionally driven from the shaft by engagement of a spring blade 63 on the reel with the shaft 61. The reel 62 is thus driven effectively through a slipping coupling that enables the speed of the reel to accommodate to changes in the diameter of the reeled laminated strip thereon.

From the foregoing description of the apparatus shown in FIGS. 1 to 4, it will be understood that the filter medium strip 4 is drawn from the reel 3 thereof and first reinforced at its edges by the deposition thereon of a rubber solution from the nozzles 19. Thereafter, the strip 4 passes through the filtration unit 7 where it is first wetted (e.g. with a 5% albumin solution when the apparatus is used in connection with radioimmunoassay of insulin as hereinafter described), thereafter receiving the mixture to be filtered and then being twice washed (e.g. with a suitable buffer solution). The strip then passes over the drier 8 where it is dried.

The strip 4, bearing filtered solids predominantly on one face thereof, then passes to the laminating unit 9 where the face bearing the filtered solids is covered by the protective adhesive film strip 12 so that the solids are reliably held in position for subsequent examination. The laminated strip then passes to the examination unit 15 and finally is reeled for storage.

The described apparatus may also be employed for examination of a reeled laminated strip. For this purpose, the reeled laminated strip may be positioned in place of hub 2 and reel 3 of filter medium strip and run under the guide rollers 13 and 14 directly to the examination unit 15, being drawn therethrough by the transport unit 16 and re-reeled by the reeling unit 17.

For most uses of the apparatus, it will be convenient to maintain continuous movement of the filter medium strip 4 at a rate related to the frequency with which individual mixtures to be filtered are delivered to the nozzle 34 such that these individual mixtures to be filtered are delivered via nozzle 34 on to suitably spaced apart lengths of the strip 4. However, in certain circumstances, for instance when the mixtures to be filtered are delivered at a low frequency, or when the nozzle 34 is connected to discrete sampling equipment producing a sample to be filtered at well-defined instants, it may be preferable to advance the filter medium strip intermittently in harmony with the periodic delivery of mixtures to be filtered, e.g. by intermittently energising the motor 45 through suitable control gear.

In order to illustrate one typical application of the apparatus of the invention there is shown in FIG. 5 a diagrammatic representation of a continuous flow reactor equipment organised to perform, in conjunction with the apparatus of FIGS. 1 to 4, radioimmunossay of insulin.

The equipment shown in FIG. 5 comprises an indexing table 70 that presents a succession of samples of insulin-containing material to a sampler 71 that is activated to draw from each sample in turn a fixed quantity thereof. The equipment further comprises a multichannel peristaltic pump 72, one channel 72a (flow rate 0.16 ml./min.) of which has its intake connected to the sampler 71 whilst other channels are connected as follows:

| Channel: | Flow rate, ml./min. | Intake |
|---|---|---|
| 72b | 0.1 | Antibody suspension source 73. |
| 72c | 0.1 | "Labelled" insulin source 74. |
| 72d | 0.16 | Air. |
| 72e and 72f | 1.6 | Buffer solution source 75. |
| 72g | 0.23 | 5% albumin solution source 76. |
| 72h and 72i | 0.1 | Rubber solution source 77. |

The outputs of channels 72a and 72b lead to a T-piece 78 for mixing the flows of these channels, the outlet limb 78a of this T-piece being connected to an injector 79 to which channel 72d is connected, the arrangement being such that for each specimen taken by the sampler 71 and mixed in T-piece 78 with antibody suspension from source 73, a bubble of air is injected from channel 72d to separate that mixture from the succeeding mixture in the outlet 79a of the injector 79.

The outlet 79a is connected to a pre-reactor tube 80 disposed in a temperature-controlled water bath 81 (4° C.).

The channel 72c is connected to a stabilizing pipe coil 82 in the water bath 81, tube 80 and pipe coil 82 being connected to a T-piece 83 where the mixtures of specimen and antibody in tube 80 are mixed, in turn, with a precise amount of "labelled" insulin from pipe coil 82. Thence the three-component mixtures, each separated from its neighbours by an air bubble, pass through an extended reactor tube 84 in the water bath 81. The tube 84 ultimately leads to nozzle 34 of the apparatus of FIGS. 1 to 4.

The channels 72e, 72f and 72g have their outputs connected to stabilizing pipe coils 85, 86, 87 in the water bath 81 and then to the nozzles 35, 36 and 33 respectively of the apparatus of FIGS. 1 to 4; the channels 72h and 72i are connected to the nozzles 19 of such apparatus.

Since each reaction mixture reaches nozzle 34 of the apparatus at a fixed interval following the drawing of the specimen, to which that mixture corresponds, by the sampler 72, the operation of the sampler may be arranged to co-operate with the recording equipment in such manner as to identify each record obtained therefrom with the sample to which it relates; alternatively, each sampler operation may be arranged to cause a marking device (not shown) to mark the filter medium strip in a manner to identify filtered solids thereon with their respective samples.

We claim:
1. In an apparatus for continuously preparing and mounting wet filtration specimens, the combination of a supply of wettable filter medium strip, a filtration unit including a support having said filter strip passing thereover, wetting means at said filtration unit for wetting said filter strip in its passage over said support, said filtration unit also including depositing means downstream from said wetting means for depositing filtration specimens on the wet filter strip, a drying unit provided downstream from said filtration unit, said drying unit being operative to dry the wet filter strip and filtration specimens thereon, a supply of a covering strip, a laminating unit continuously securing said covering strip to said filter strip so as to cover filtration specimens deposited thereon by said filtration unit, said laminating unit including transport means for the laminated filter and covering strips, and take-up means receiving the laminated strips from said laminating unit, said laminating unit including said transport means comprising a rotatable drum having said filter strip and said covering strip passing around the same in juxtaposd relation, means for rotating said drum, a frame pivotally mounted for movement toward and away from the drum, a laminating roller carried by said frame adjacent the periphery of the drum, and a guide roller carried by the frame at a point remote from said laminating roller and from the pivotal mounting of the frame, said filter strip and said covering strip passing around the respective laminating and guide rollers into juxtaposition between the laminating roller and the drum and their passage around the respective rollers being effective to bias said frame toward the drum for tensionally controlled lamination of the strips between the drum and the laminating roller.

2. The apparatus as defined in claim 1 wherein said filtration unit also includes washing means downstream from said depositing means, said washing means being operative to discharge washing liquid onto filtration specimens deposited on said filter strip by said depositing means.

3. The apparatus as defined in claim 1 together with a reinforcing unit provided between said filter strip supply and said filtration unit, said reinforcing unit being operative to apply a liquid reinforcng agent to longitudinal edge portions of the filter strip prior to its wetting by said wetting means at the filtration unit.

References Cited

UNITED STATES PATENTS 3,036,893   5/1962   Natelson _____ 23—253

ARCHIE R. BORCHELT, Primary Examiner

U.S. Cl. X.R.

250—43.5, 83.6; 356—36